(No Model.)
W. H. MARSH.
ROTARY FLUID METER.
No. 597,066. Patented Jan. 11, 1898.
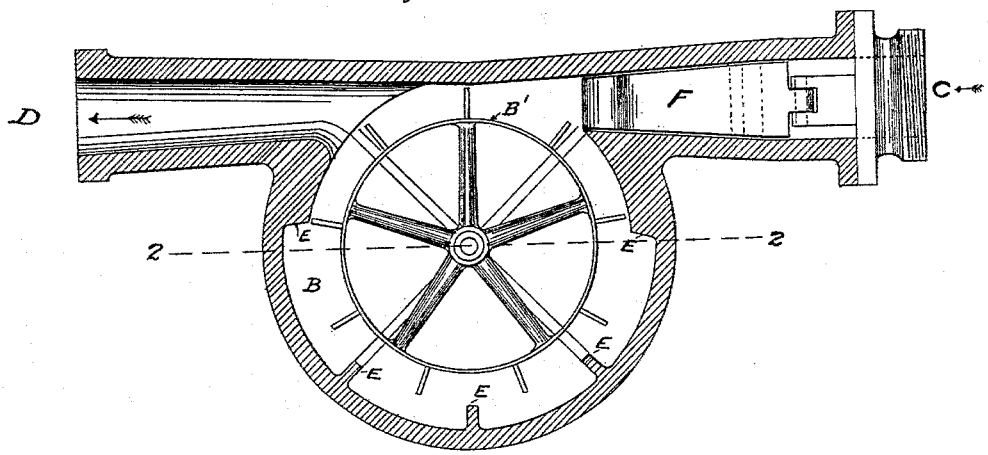
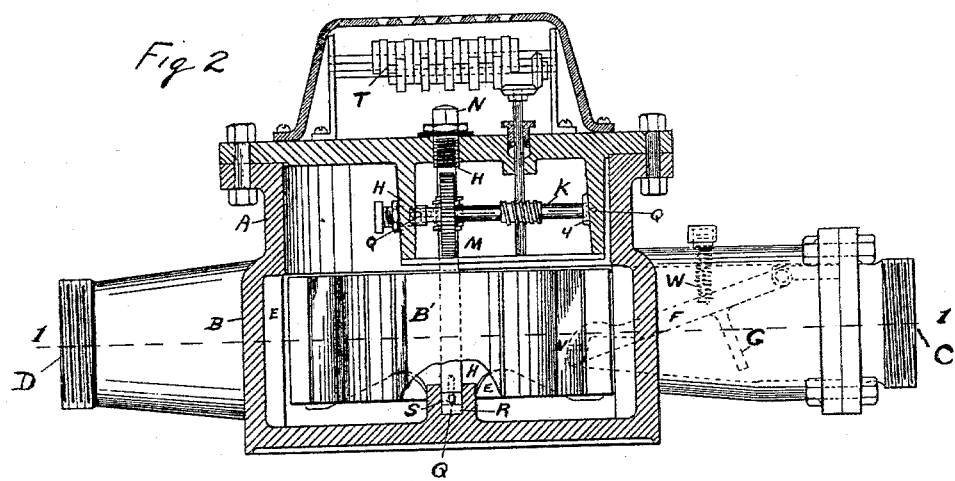
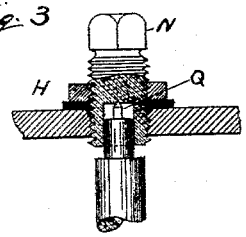
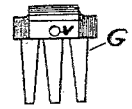
Witnesses
David Whyte
C. J. Plauwell
Inventor
William H. Marsh

UNITED STATES PATENT OFFICE.

WILLIAM H. MARSH, OF BROOKLYN, NEW YORK, ASSIGNOR TO THE STANDARD WATER METER COMPANY, OF NEW YORK, N. Y.

ROTARY FLUID-METER.

SPECIFICATION forming part of Letters Patent No. 597,066, dated January 11, 1898.

Application filed March 7, 1895. Serial No. 540,850. (No model.)

*To all whom it may concern:*

Be it known that I, WILLIAM H. MARSH, a citizen of the United States, and a resident of Brooklyn, in the county of Kings and State of New York, have invented certain new and useful Improvements in Rotary Fluid-Meters, of which the following is a specification.

The object of my invention is to provide a simple, durable, and efficient meter that will measure correctly, that cannot be run backward, that cannot be materially affected by heat or cold, and which is provided with a registering apparatus that can be read at a glance, the figures being always in line. I attain these objects by mechanism illustrated in the accompanying drawings, in which—

Figure 1 is a longitudinal section of a meter embodying the invention on line 1 1 of Fig. 2. Fig. 2 is a vertical section of same on line 2 2 of Fig. 1. Fig. 3 is an enlarged sectional view of adjustable bearings for same. Fig. 4 is a bottom view of the inlet-nozzle for said meter. Fig. 5 is an end view of said inlet-nozzle.

Similar letters refer to similar parts throughout the several views.

Fig. 2 represents the exterior body of the meter, the upper part A containing the reducing-gear and the lower part B the wheel, with inlet-port C and outlet-port D directly in line. Upon the bottom and inner walls of the part B are cast ridges E for the purpose of retarding the flow through this portion of the meter and also for preventing the spinning of the wheel when the water is suddenly shut off.

To combine lightness and strength and also to resist heat and cold, the wheel B' is preferably made of aluminium.

Within the inlet C is an automatic nozzle or check-valve F, made heavy enough to compress the stream and give impact to the flow. This can be so adjusted as to register a very small stream. If desired, the compress can be assisted by a spring W. The impact of the small or leaky stream can be further accelerated by one or more small holes for jets V.

Upon the under surface of the nozzle F is a brake or screen G, shown here rake-tooth shaped, but can be perforated, if desired. The object of this is to receive the shock of water-hammer when the water is suddenly turned off or on, thereby preventing injury to the working parts of the meter. It also assists to regulate the flow of the water and prevents stones and foreign substances from entering the meter.

The spindles K and M are provided with adjustable duplex bearings so constructed that when the meter is running with a small stream the weight rests solely on the point Q, the heavier portion being always available for heavy use, the wear being taken up by the adjustable screw N. The screw on the spindle M is made to travel upward, thereby lifting the wheel and diminishing the friction.

R in Fig. 2 is a hardened step kept clean by the constant wash of the water through the hole S.

T is a decimal counter or register.

The inlet-port C and outlet-port D are directly opposite each other, the passage of the water being unobstructed, except so far as it is resisted by the wheel B', which resistance is reduced to a minimum, the object being to register the velocity of the water as it passes through the meter, and thereby ascertain the quantity discharged.

What I claim, and desire to secure by Letters Patent, is—

1. In a fluid-meter, the casing having the inlet and outlet ports, combined with the wheel mounted in said casing, and the automatic valve F hinged at its upper outer end at the upper side of said inlet and thence normally inclining inward and downward, an aperture V being provided at the extreme inner end of said valve; substantially as and for the purposes set forth.

2. In a fluid-meter, the casing having the inlet and outlet ports, combined with the wheel mounted in said casing, and the automatic valve F hinged at its upper outer end at the upper side of said inlet and thence normally inclining inward and downward, said valve being provided on its lower side with the brake G; substantially as and for the purposes set forth.

Witness my hand this 6th day of March, in the year 1895.

WILLIAM H. MARSH.

In presence of—
DAVID WHYTE,
C. J. MANNTE.